(12) United States Patent
Mohanraj et al.

(10) Patent No.: US 11,691,396 B2
(45) Date of Patent: Jul. 4, 2023

(54) PRE-APPLIED MEMBRANES

(71) Applicant: BRITISH POLYTHENE LIMITED, Northamptonshire (GB)

(72) Inventors: Jagan Mohanraj, Derbyshire (GB); Cameron Yates, Derbyshire (GB)

(73) Assignee: BRITISH POLYTHENE LIMITED, London (GB)

( * ) Notice: Subject to any disclaimer, the term of this patent is extended or adjusted under 35 U.S.C. 154(b) by 0 days.

(21) Appl. No.: 17/291,529

(22) PCT Filed: Nov. 5, 2019

(86) PCT No.: PCT/GB2019/053129
§ 371 (c)(1),
(2) Date: May 5, 2021

(87) PCT Pub. No.: WO2020/095036
PCT Pub. Date: May 14, 2020

(65) Prior Publication Data
US 2022/0072830 A1 Mar. 10, 2022

(30) Foreign Application Priority Data
Nov. 6, 2018 (GB) .................................... 1818077

(51) Int. Cl.
*B32B 27/32* (2006.01)
*B32B 25/08* (2006.01)
(Continued)

(52) U.S. Cl.
CPC ................ *B32B 25/08* (2013.01); *B32B 7/06* (2013.01); *B32B 25/18* (2013.01); *B32B 27/18* (2013.01);
(Continued)

(58) Field of Classification Search
CPC .. C08L 21/00; C08L 23/22; C08L 9/02; C08L 17/00; C08L 2207/20; C08K 3/26; C08K 3/346; C08K 2003/265; B32B 2250/02; B32B 2250/03; B32B 2250/24; B32B 2255/10; B32B 2255/26; B32B 2264/10; B32B 2264/104; B32B 2270/00; B32B 2272/00; B32B 2307/716; B32B 2307/7242; B32B 2307/7265; B32B 2307/732; B32B 2419/00; B32B 25/02; B32B 25/08; B32B 25/12; B32B 25/18;
(Continued)

(56) References Cited

U.S. PATENT DOCUMENTS 5,854,327 A 12/1998 Davis et al.
2013/0104495 A1 5/2013 Wiercinski et al.

FOREIGN PATENT DOCUMENTS

CN 107857901 3/2018
CN 108360694 8/2018
(Continued)

OTHER PUBLICATIONS

Gatinet, Bruno "International Search Report and Written Opinion" PCT/GB2019/053129; dated Jan. 28, 2020.
(Continued)

*Primary Examiner* — Lawrence D Ferguson
(74) *Attorney, Agent, or Firm* — Nicholas J. Landau; Maynard Nexsen PC

(57) ABSTRACT

A laminated pre-applied membrane is provided. The membrane comprises a layer of polyethylene and a rubber or rubber-based layer.

19 Claims, 2 Drawing Sheets

(51) Int. Cl.
  *B32B 7/06*      (2019.01)
  *B32B 25/18*     (2006.01)
  *B32B 27/18*     (2006.01)
  *B32B 27/30*     (2006.01)
  *C08K 3/26*      (2006.01)
  *C08K 3/34*      (2006.01)

(52) U.S. Cl.
  CPC ............ *B32B 27/306* (2013.01); *B32B 27/32* (2013.01); *C08K 3/26* (2013.01); *C08K 3/346* (2013.01); *B32B 2250/24* (2013.01); *B32B 2270/00* (2013.01); *B32B 2272/00* (2013.01); *B32B 2307/716* (2013.01); *B32B 2307/7242* (2013.01); *B32B 2307/7265* (2013.01); *B32B 2307/732* (2013.01); *C08K 2003/265* (2013.01)

(58) Field of Classification Search
  CPC ....... B32B 27/18; B32B 27/306; B32B 27/32; B32B 27/327; B32B 7/06; E04B 1/665
  See application file for complete search history.

(56) References Cited

FOREIGN PATENT DOCUMENTS

| | | |
|---|---|---|
| EP | 1193283 | 8/2001 |
| WO | PCTUS2010020583 | 8/2010 |
| WO | PCTUS2015052814 | 4/2017 |

OTHER PUBLICATIONS

Mthupha, Albert Dr. "United Kingdom patent search" GB1818077.8 dated May 14, 2019.

Figure 1

| COMPONENT | CONTENT (%) | DETAILS |
|---|---|---|
| Synthetic Rubber | 67 | Blend of virgin or reclaimed nitrile/butyl rubber |
| Mineral additive | 20 | chalk, metakaolin |
| Process aids | 13 | stabilising agents, softening agents/tackifier, colour (carbon black) |
| | 100% | |

Figure 2

| COMPONENT | CONTENT (%) | DETAILS |
|---|---|---|
| Synthetic Rubber | 67 | Blend of virgin or reclaimed nitrile/butyl rubber |
| Mineral additive | 20 | chalk, metakaolin |
| Process aids | 13 | stabilising agents, softening agents/tackifier, colour (carbon black) |
| | 100% | |

Figure 3

| COMPONENT | CONTENT (%) | DETAILS |
|---|---|---|
| PVOH | 50 | |
| Mineral additive | 50 | metakaolin |
| | 100% | |

Figure 4

| Sample | Metakaolin added | Peel force (N/5cm)* (t = 72 hours) | | | | | |
|---|---|---|---|---|---|---|---|
| | | 1 | 2 | 3 | 4 | 5 | Mean |
| 1 | No | 1.40 | 1.30 | 1.20 | 1.40 | 1.40 | 1.34 |
| 2 | Yes | 7.12 | 7.10 | 7.30 | 7.10 | 7.00 | 7.12 |

PRE-APPLIED MEMBRANES

CROSS-REFERENCE TO RELATED APPLICATIONS

This application is a national stage under 35 U.S.C. 371 of International Application No. PCT/GB2019/053129 having an international filing date of 5 Nov. 2019. International Application No. PCT/GB2019/053129 cites the priority of Great Britain Patent Application No. 1818077.8, filed on 6 Nov. 2018.

The present invention relates generally to a pre-applied membrane.

Pre-applied membranes are positioned on the underside prior to the pouring of concrete over them. This type of sheet-like membrane is used for various purposes, including structural waterproofing and gas protection.

In order to ensure that the membrane functions it is important for there to be an intimate bond between the membrane and the post-poured building material after it sets.

An aspect of the present invention provides a laminated pre-applied membrane comprising a layer of polyethylene and a rubber or rubber-based layer.

The rubber or rubber-based layer may include a mineral additive

The mineral additive may comprise kaolin.
The mineral additive may comprise kaolinite.
The mineral additive may comprise metakaolin.
The mineral additive may comprise calcium carbonate.

The polyethylene (PE) layer may be a film having a thickness of approximately 1 mm.

An aspect of the present invention provides a pre-applied membrane comprising a base layer and a rubber or rubber-based layer, in which the rubber or rubber-based layer includes a mineral additive, and in which the mineral additive comprises kaolin and/or kaolinite.

In its natural state kaolin is a white, soft powder consisting principally of the mineral kaolinite.

The term kaolinite describes the name of a group of closely-related clay minerals, as well as an individual member mineral of the group. The members of the Kaolinite group all have the same (or similar) chemical formula, and they are Dickite, Kaolinite, Nacrite, Halloysite, and Odinite. Kaolinite also has a very similar chemical formula to Serpentine, and is sometimes considered a member of the Serpentine group.

An aspect of the present invention provides a pre-applied membrane comprising a base layer and a rubber or rubber-based layer, in which the rubber or rubber-based layer includes a mineral additive, and in which the mineral additive comprises metakaolin.

The present inventors have found that the addition of metakaolin can, for example, be used to augment the initial bond between the membrane and the building material, and significantly reduces the bonding time.

Metakaolin is a dehydroxylated form of the clay mineral kaolinite.

The base layer may be a plastics layer.

The base layer may comprise one or more of: low density polyethylene (LDPE) low linear density polyethylene (LL-DPE), medium density polyethylene (MDPE), high density polyethylene (HDPE), ethylene vinyl alcohol (EVOH), Nylon (RTM) and other multi-layer film structures. In one embodiment the base layer is a PE or PE-based plastics layer.

The base layer can be used, for example, to provide mechanical properties, waterproofing and gas resistant properties for the membrane.

The present invention also provides a pre-applied membrane including a rubber layer, in which the rubber layer comprises a mineral additive and in which the mineral additive comprises kaolin and/or kaolinite, such as metakaolin.

In aspects and embodiments of the present invention the rubber layer or rubber-based layer comprises natural and/or synthetic rubber.

In some embodiments the rubber or rubber-based layer comprises butyl rubber, for example reclaimed butyl rubber or a blend of butyl and reclaimed rubber.

In some embodiments the rubber or rubber-based layer is a blend of virgin or reclaimed nitrile and butyl rubber.

In some embodiments a mineral additive is mixed into the rubber or rubber-based layer. Alternatively or additionally a mineral additive may be embedded in an upper surface of the rubber or rubber-based layer. Embodiments in which, for example, metakaolin, is physically blended on the surface of the rubber layer onto which the building material is applied may be advantageous.

The membrane may further comprise one or more process aids, such as one or more of: stabilising agents; softening agents; tackifiers; and colourants.

The membrane may further comprise a removable release sheet. This is useful, for example, for allowing the membrane to be rolled up and not sticking to itself.

The release sheet/liner/layer may have a thickness in the range 0.03 mm to 0.15 mm. The rubber or rubber-based layer may have a thickness in the range 0.4 mm to 1.0 mm.

The base layer may have a thickness in the range 0.55 mm to 1.25 mm.

The mineral additive may be present in an amount of 5% to 40% by weight.

The mineral additive may further comprise calcium carbonate or the like.

The present invention also provides a membrane that bonds to cement mortar or concrete cast against it, comprising a carrier layer and a rubber or rubber-based layer, in which a release liner is provided on the rubber or rubber-based liner, and in which the release liner is dissolvable.

The release liner may be water soluble and/or pH soluble. The intention being that the liner dissolves in use, for example when concrete is poured onto the membrane.

The release liner and/or the rubber or rubber-based layer may include a mineral additive, the mineral additive comprising kaolin and/or kaolinite, such as metakaolin.

The carrier layer may comprise one or more of: LLDPE, LDPE, MDPE, HDPE, EVOH Nylon (RTM) and other multi-layer film structures.

The release liner may be formed from PVOH. Poly(vinyl alcohol) (PVOH, PVA, or PVAl) is a water-soluble synthetic polymer.

A membrane as claimed in any preceding claim, comprising a laminated structure with a layer of PE and a layer of rubber.

The present invention also provides a waterproofing membrane comprising a membrane as described herein.

The present invention also provides a gas barrier membrane comprising a membrane as described herein.

The present invention also provides a rubber or rubber-based material comprising calcium carbonate and/or kaolin and/or kaolinite, such as metakaolin.

The present invention also provides a rubber or rubber-based material for a pre-applied membrane, the material comprising calcium carbonate and/or kaolin and/or kaolinite, such as metakaolin.

The present invention also provides for a construction site having one or more membranes as described herein.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combinations other than those explicitly set out in the claims.

The present invention is more particularly shown and described, by way of example, in the accompanying drawings.

The example embodiments are described in sufficient detail to enable those of ordinary skill in the art to embody and implement the systems and processes herein described. It is important to understand that embodiments can be provided in many alternative forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In the description, all orientational terms, such as upper, lower, radially and axially, are used in relation to the drawings and should not be interpreted as limiting on the invention.

FIG. 1 shows an example of a membrane formed in accordance with the present invention.

FIG. 2 shows an example of the constituents of a rubber layer formed in accordance with the present invention.

Figures 5, 6:
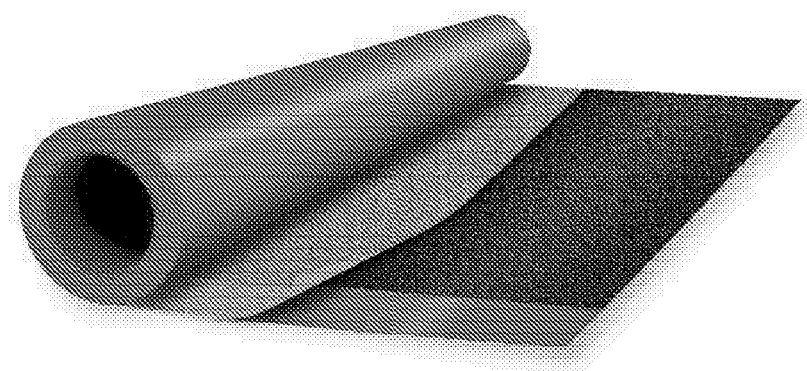

In other embodiments different percentages of components can, of course, be used;

for example:
Rubber 30% to 75%
Mineral Additive 1% to 30%
Process Aids 5% to 30%

The mineral additive may, for example be: calcium carbonate and/or kaolin and/or kaolinite and/or metakaolin.

FIG. 3 shows an example of the constituents of a rubber layer useful in conjunction with a dissolvable release liner formed in accordance with the present invention.

FIG. 4 shows the constituents of a dissolvable release liner formed in accordance with the present invention.

FIG. 5 below illustrates the improved bond strength between membrane and the concrete after 3 days.

*Sample area=125 cm$^2$ (5 cm wide by 25 cm long). i.e. the rubber layer of this area size is in contact with the concrete. 180 degree peel adhesion test performed.

The force required to peel of the sample area is recorded above. When comparing sample 1 (control sample with no additive) to sample 2 (sample with mineral additive), the force required to pull sample 2 away from the concrete was more than 5 times than sample 1.

FIG. 6 shows an example of a roll of structural waterproofing pre-applied membrane.

The membrane is a laminated structure with a layer of PE and a butyl rubber layer. In this embodiment a release layer is included.

The PE layer provides puncture resistance. The rubber layer chemically engages with concrete in use.

The dimensions shown are non-limiting.

The rubber layer may have a mineral additive.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A multi-layer pre-applied membrane comprising a carrier layer comprising polyethylene and a rubber or rubber-based layer against which post-poured building material such as concrete or cement mortar can be cast such that the rubber or rubber-based layer chemically engages with the post-poured building material and such that there is an intimate bond between the membrane and the post-poured building material after it sets, in which the rubber or rubber-based layer comprises process aids and a blend of virgin butyl rubber and reclaimed butyl rubber, and in which the rubber or rubber-based layer further comprises mineral additive that comprises a kaolin to augment the initial bond between the membrane and the post-poured building material and to reduce the bonding time.

2. The membrane according to claim 1, in which the mineral additive comprises kaolinite.

3. The membrane according to claim 1, in which the mineral additive comprises metakaolin.

4. The membrane according to claim 1, in which the mineral additive comprises parakaolin.

5. The membrane according to claim 1, in which the mineral additive comprises calcium carbonate.

6. The membrane according to claim 1, in which the carrier layer is a film having a thickness of approximately 1 mm.

7. The membrane according to claim 1, in which the carrier layer comprises one or more of: LLDPE, LDPE, MDPE, HDPE.

8. The membrane according to claim 1, in which mineral additive is mixed into the rubber or rubber-based layer.

9. The membrane according to claim 1, in which mineral additive is embedded in an upper surface of the rubber or rubber-based layer.

10. The membrane according to claim 1, in which the process aids comprise one or more of: stabilising agents; softening agents; tackifiers; and colourants.

11. The membrane according to claim 1 and further comprising a removable release sheet.

12. The membrane according to claim 1, in which the release sheet has a thickness in the range 0.03 mm to 0.15 mm.

13. The membrane according to claim 1, in which the rubber or rubber-based layer has a thickness in the range 0.4 mm to 1.0 mm.

14. The membrane according to claim 1, in which the carrier layer has a thickness in the range 0.55 mm to 1.25 mm.

15. A membrane that bonds to cement mortar or concrete cast against it, comprising a carrier layer and a rubber or rubber-based layer comprising a mixture of virgin and reclaimed butyl rubber, and kaolin, in which a release liner is provided on the rubber or rubber-based layer, and in which the release liner is dissolvable when cement mortar or concrete is poured onto the membrane.

16. The membrane according to claim 15, in which the rubber or rubber-based layer includes a mineral additive, and in which the kaolin comprises metakaolin and/or parakaolin.

17. The membrane according to claim 15, in which the release liner is formed from PVOH.

18. The membrane according to claim 15, in which the rubber or rubber-based layer comprises a blend of virgin butyl rubber and reclaimed butyl rubber.

19. A construction site having one or more multi-layer pre-applied membranes according to claim 1.

\* \* \* \* \*

UNITED STATES PATENT AND TRADEMARK OFFICE
CERTIFICATE OF CORRECTION

| | |
|---|---|
| PATENT NO. | : 11,691,396 B2 |
| APPLICATION NO. | : 17/291529 |
| DATED | : July 4, 2023 |
| INVENTOR(S) | : Jagan Mohanraj and Cameron Yates |

It is certified that error appears in the above-identified patent and that said Letters Patent is hereby corrected as shown below:

On the Title Page

Item (73) currently reads:
"Assignee: BRITISH POLYTHENE LIMITED,
London (GB)"

Should read:
"Assignee: BRITISH POLYTHENE LIMITED,
Northamptonshire (GB)"

Signed and Sealed this
Seventeenth Day of October, 2023

*Katherine Kelly Vidal*

Katherine Kelly Vidal
*Director of the United States Patent and Trademark Office*